Jan. 15, 1924. 1,481,139
R. J. McCLENNY ET AL
BARREL MAKING MACHINE
Filed June 20, 1922 3 Sheets-Sheet 1

WITNESSES
INVENTOR
R. J. Mc. Clenny
D. B. Bardin
BY
ATTORNEYS

Patented Jan. 15, 1924.

1,481,139

UNITED STATES PATENT OFFICE.

ROBERT J. McCLENNY, OF EAST PALATKA, AND DAVID B. BARDIN, OF PALATKA, FLORIDA.

BARREL-MAKING MACHINE.

Application filed June 20, 1922. Serial No. 569,694.

*To all whom it may concern:*

Be it known that we, ROBERT J. McCLENNY and DAVID B. BARDIN, both citizens of the United States, and residents, respectively, of East Palatka, in the county of Putnam and State of Florida, and of Palatka, in the county of Putnam and State of Florida, have invented new and useful Improvements in Barrel-Making Machines, of which the following is a full, clear, and exact description.

This invention relates to barrel making machines.

The general object of this invention is the provision of a cheap, simple and efficient machine for assembling barrels.

A particular object of the invention is the provision of a barrel assembling machine having a clamping device for clamping the staves in barrel formation which is mounted to slide along vertical lines and balanced so that it may be easily raised and lowered.

Another object of the invention is the provision of a platform for supporting the staves in alinement which may be lowered to receive a hoop for projecting it onto the barrel after the barrel has been shaped.

A further object of the invention is the provision of a barrel making machine provided with cam operated jaws for shaping the barrel.

These objects are accomplished by providing means for supporting prepared barrel staves in circular formation, and means for shaping the barrel staves to form a barrel.

These and other objects of the invention will be more clearly understood from the following detailed description and accompanying drawings, in which—

Figure 5 is a perspective view of the platform provided in conjunction with the barrel making machine, showing the former in its lowered position.

Figure 1:
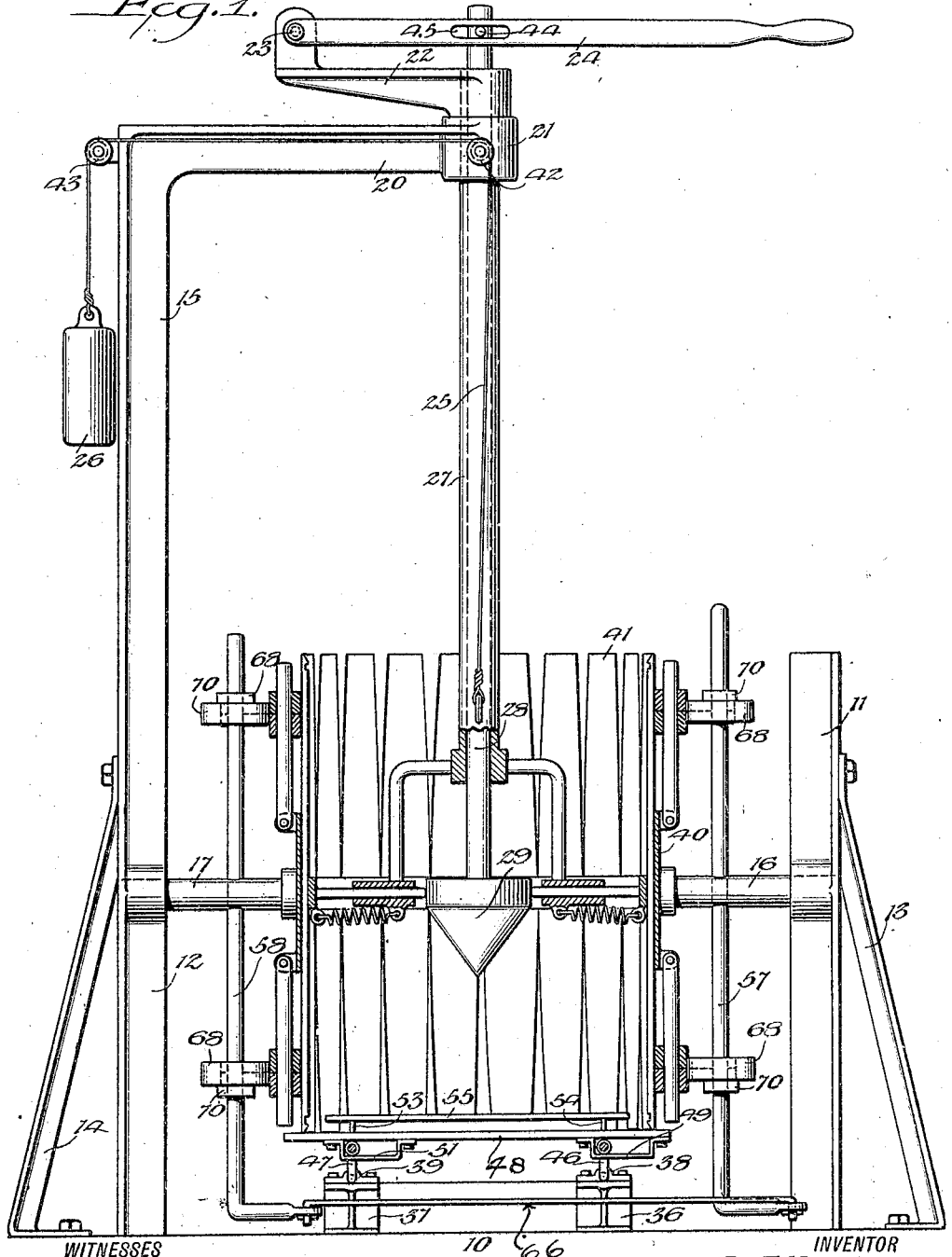
Figure 1 is a section through the machine showing the staves supported in circular formation.

Referring to the above-mentioned drawings, which show a preferred embodiment of the invention, a frame, consisting of vertical supports 11 and 12 mounted on a base 10 and strengthened by braces 13 and 14, is shown. Attached to these supports 11 and 12 and extending horizontally inward in line with one another are two arms 16 and 17. Attached to these arms is a cylinder 40 which serves as a means for holding the staves 41 in circular formation. An extension 15 of the vertical support 12 has a head 20 extending at right angles thereto. Attached to the end of the head 20 is a bearing 21 in which a hollow plunger rod 27 is slidably mounted. Slidably mounted in the hollow plunger rod 27 is another plunger rod 28, to the end of which is attached a cone-shaped head 29. Attached to the hollow plunger rod 27 and extending at right angles thereto is an arm 22 to which a lever 24 is hinged at 23. This lever is provided with a slot 45 which engages a pin 44 on the plunger rod 28. Thus a means is provided for operating the plunger rod 28 within the hollow plunger rod 27. Attached to the lower end of the hollow plunger rod 27 are a plurality of depending arms 30, to which bearings 34 are attached. Slidably mounted in each of the bearings 34 are rods 33 carrying arc-shaped plates 32. Springs 35 are connected between the bearings and the arc-shaped plates so as to normally retain the arc-shaped plates drawn in close to the bearings 34. The inner ends of the rods 33 are rounded and extend radially inward in the direction of a point in alinement with the apex of the cone-shaped head 29. Hence, when it is desired to slide the rods 33 outward to force the plates 32 outward this can be done by operating the lever 24, forcing the cone-shaped head 29 downward into engagement with the rods 33. In order that the plunger rods and clamping means may be easily moved along vertical lines through the bearing 21, a weight 26 is provided and connected by means of a cable 25 to the hollow plunger rod 27. This cable extends over pulleys 42 and 43. The weight of the cable is sufficient to balance the weight of the plunger rods and clamping means.

Mounted on the base 10 are two eye-beams 36 and 37 which carry bearings 38 and 39. Crank-shaped members 46 and 47 are rotatably mounted in these bearings 38 and 39. A lever 50 is provided in conjunction with these crank-shaped members for operating them. Carried by these crank-shaped members is a platform 48 having two brackets 49 and 51 attached to its lower face, in which the crank-shaped members slide. This platform 48 when in its raised position serves to support the staves 41 in alinement, and after the machine has been operated to shape the barrel it may be lowered to allow the introduction of a hoop 52. Plates 53 and 54 may be provided in conjunction with the platform 48 for supporting a barrel end 55 at the proper height to engage in the croze grooves normally provided in the barrel staves.

The shaping means of this barrel making machine consists of a plurality of rods 56 hinged to the stave supporting cylinder 40 and a plurality of depending rods 59 also hinged to the stave supporting cylinder 40. Rotatably mounted on the rods 56 and 59, and in pairs, are curved jaws 60. The pairs of jaws mounted at the top are located directly opposite one another. Each jaw is provided with a curved face 61 and each pair of jaws has the curved faces 61 facing inward. Two vertical rods 57 and 58 are rotatably mounted in the arms 16 and 17, respectively, as shown at 62 and 63. Attached to the lower ends of these rods are arms 64 and 65 which extend in a horizontal plane, and a connecting rod 66 is mounted between the arms 64 and 65. Attached to the upper end of the vertical rod 57 is a lever 67 for rotating the rods. Mounted on the rods 57 and 58 and in alinement with the curved faces 61 of the jaws 60 are a plurality of cams 68. The operation of the rods forces the cams into engagement with the faces 61 of the jaws 60 and serves as a means for swinging the jaws 60 into engagement with the staves 41 to press them inward. Mounted on the pivoted rods 56 and 59 and above each pair of jaws is an arc-shaped plate 69. These plates are engaged by cams 70 which are mounted on the rods 57 and 58 to extend at right angles to the cams 68 so that when the cams 68 engage the jaws 60 to force the staves of the barrel inward, the cams 70 engage the plates 69, forcing opposite pairs of jaws inward toward one another, thus serving in conjunction with the cams 68 to give the barrel the proper shape.

Figure 2:
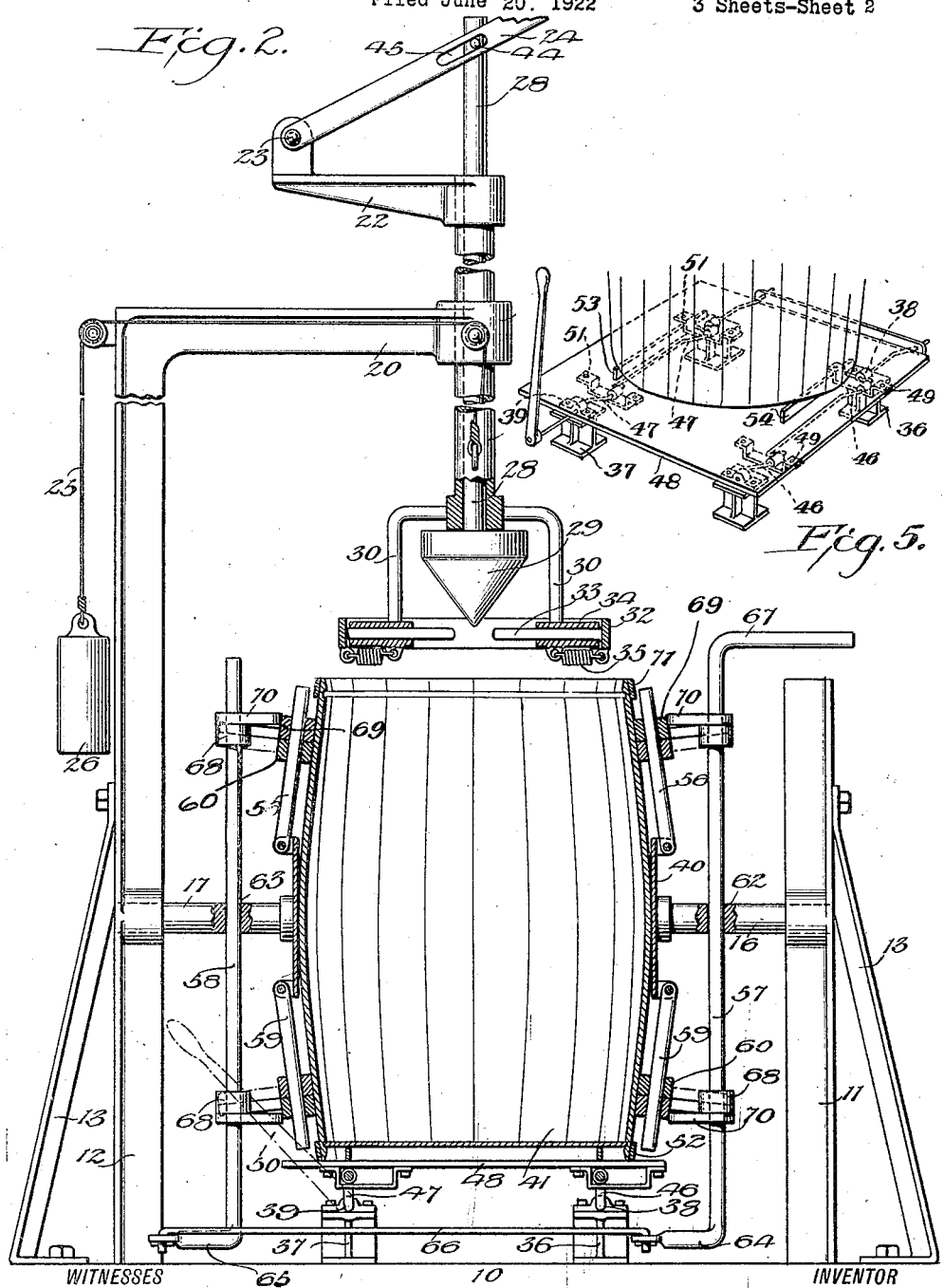
Figure 2 is a section through the machine showing the machine after it has been operated to shape the barrel.
Figure 3:
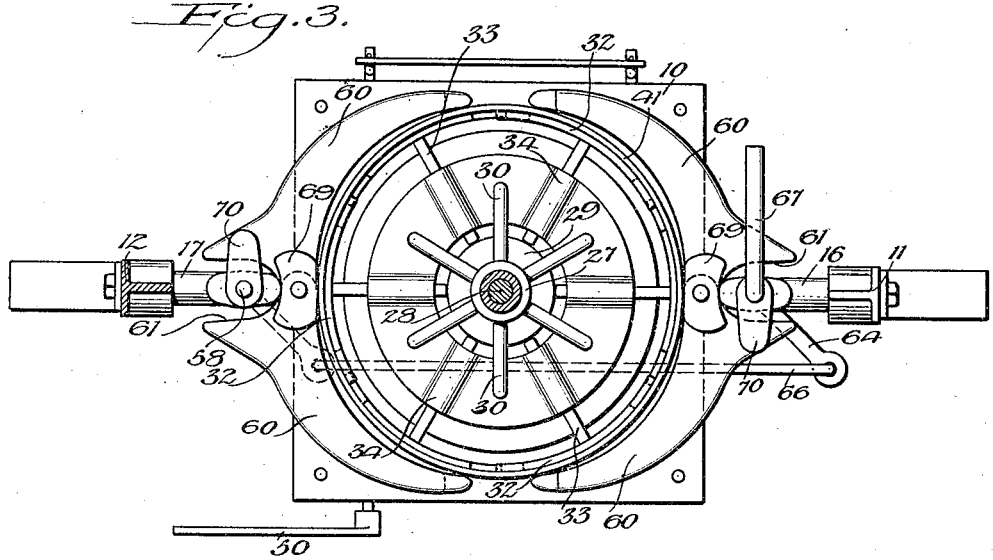
Figure 3 is a top plan view of the barrel making machine showing the jaws expanded.
Figure 4:
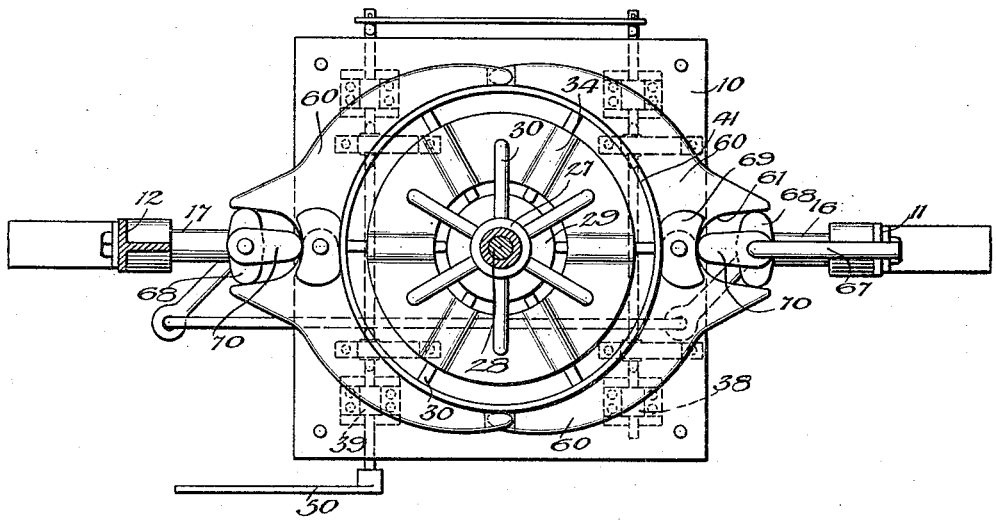
Figure 4 is a top plan view of the barrel making machine showing the jaws closed to give the barrel the proper shape.

The operation of the machine is as follows:

The plunger rods which carry the clamping means are normally positioned as shown in Figure 2, and the jaws are in their expanded position as shown in Figure 3. The staves 41 are then arranged in circular formation in the cylinder 40 and supported in alinement by the platform 48. The next step in the formation of the barrel is the drawing down of the plunger rods, positioning the arc-shaped plates 32 in alinement with a circumferential line extending transversely of the staves at their centers. By the operation of the lever 24 the head 29 is forced downward into engagement with the rods 33, forcing the arc-shaped plates 32 tightly into engagement with the staves 41. The staves are now clamped in position. The lever arm 67 is now operated, rotating the rods 57 and 58 to operate the cams 68 and 70. The cams 68 engage the curved faces 61 of the jaws 60, rotating them on the rods 56 and 59, forcing them into engagement with the staves while the cams 70 engage the arc-shaped plates 69, forcing the opposite pairs of jaws inward. Thus the staves are given the proper shape. The platform 48 is now lowered by the operation of the lever 50 and the hoop 52 is placed in position on the platform and by the raising of the platform the hoop 52 is positioned on the lower end of the barrel staves. The arc-shaped plates 32 are now released from the barrel staves, and the plunger rods together with the clamping means raised. A hoop 71 is then placed over the upper end of the barrel staves. The jaws 60 are then released from the barrel staves by the operation of the lever 67 and the barrel removed from the barrel making machine.

We would state in conclusion that while the illustrated examples constitute a practical embodiment of our invention, we do not limit ourselves strictly to the exact details herein illustrated since manifestly the same can be considerably varied without departing from the spirit of the invention as defined in the appended claims.

Claims:

1. A machine for making barrels from staves, comprising means for supporting the staves in barrel formation, means for forcing the ends of the barrel staves inward to receive hoops, means for engaging the barrel staves along circumferential lines extending transversely of the middle parts of the staves to retain them in position while the ends are being pressed inward, and a balanced cone for operating the means for engaging the barrel staves along the circumferential lines.

2. A machine for making barrels from staves, comprising means for holding the staves in barrel formation and in a vertical position, means for engaging the staves along circumferential lines extending transversely of the staves near their middle parts, said means being balanced and mounted to move along vertical lines, curved jaws for engaging the upper and lower ends of the barrel staves to press them inward to form a barrel to receive hoops, and cam means associated with said jaws for operating them to press the ends of the barrel staves inward.

3. A barrel making machine, comprising a frame, means mounted on the frame for holding the barrel staves in barrel formation in a vertical position, means for engaging the inner faces of the barrel staves along a circumferential line extending transversely of the staves near their centers, said engaging means being mounted to slide along vertical lines and balanced by a weight, and means for forcing the engaging means into engagement with the barrel staves, jaw means for engaging the ends of the barrel staves to press them inward about the engaging means to form a barrel, and lever-operated cams for operating said jaws.

4. In a machine for making barrels from staves, a barrel-shaping device, comprising means for clamping the staves in barrel formation, four pairs of curved jaws pivotally mounted, two for engaging the top of the barrel and two the bottom, cams associated with the jaws for operating them, causing the pairs of jaws to approach each other to press inward the barrel staves, and lever means for operating said cams.

5. In a machine for making barrels from staves comprising a frame, means carried by the frame for retaining the staves in barrel formation, means for clamping the staves in engagement with the means for retaining them in barrel formation, curved pivotally mounted jaws carried by the means for supporting the staves in barrel formation, two pairs being provided at the top and two pairs at the bottom, cams associated with the jaws for operating them, causing the pairs of jaws to approach each other and lever means for operating said cams.

6. In a barrel making machine, a barrel shaping device comprising a plurality of curved jaws rotatably mounted on hinged members, means for closing the jaws on the barrel staves, and means for forcing opposite pairs of jaws toward one another to give the barrel proper shape.

7. A barrel making machine comprising a frame, means for supporting the staves in circular formation carried by the frame, a plurality of curved jaws rotatably mounted in pairs on rods hinged to the supporting means, two pairs of oppositely disposed jaws at the top and two pairs at the bottom, cams supported on the frame for closing the jaws on the barrel staves, cams for moving the opposite pairs of jaws inward toward one another, and means for operating the cams.

8. A barrel making machine comprising a frame, means carried by the frame for supporting staves in circular formation, means for clamping the staves in position mounted on the frame, a plurality of curved jaws rotatably mounted in pairs on rods hinged to the supporting means, cams mounted on rods carried by the frame for operating said jaws to press the ends of the staves inward, and cams associated with said first mentioned cams to force the pairs of jaws toward one another to give the barrel proper shape.

9. In a machine for making barrels from staves, a barrel-shaping device comprising means for clamping the staves in circular arrangement, a plurality of pivotally mounted swinging jaws carried by the means for clamping the staves in circular arrangement, and means for operating the jaws to grip the ends of the barrel staves and for projecting the jaws inward to give the barrel staves the required shape.

10. In a machine for making barrels from staves, a barrel-shaping device comprising means for clamping the staves in barrel formation, supports hinged on said clamping means, a pair of jaws pivotally mounted on each support, means for operating the jaws to grip the ends of the staves, and means for projecting the pairs of jaws inward as they grip the barrel staves thus shaping the staves.

11. In a machine for making barrels from staves, a barrel-shaping device comprising means for clamping the staves in barrel formation, a plurality of pairs of swinging jaws mounted for gripping the ends of the barrel staves, means for operating said jaws, and means for giving them a transverse motion toward one another as they grip the ends of the barrel staves.

ROBERT J. McCLENNY.
DAVID B. BARDIN.